Feb. 16, 1965     B. D. SMITH, JR., ET AL     3,170,155

QUANTIZER

Filed March 8, 1961     6 Sheets-Sheet 1

INVENTORS
BLANCHARD D. SMITH, JR.
ARTHUR H. BALLARD
BY

ATTORNEYS

INVENTORS
BLANCHARD D. SMITH, JR.
ARTHUR H. BALLARD

Feb. 16, 1965  B. D. SMITH, JR., ETAL  3,170,155
QUANTIZER

Filed March 8, 1961  6 Sheets-Sheet 4

INVENTORS
BLANCHARD D. SMITH, JR.
ARTHUR H. BALLARD
BY
ATTORNEYS

United States Patent Office 3,170,155
Patented Feb. 16, 1965

3,170,155
QUANTIZER
Blanchard D. Smith, Jr., Alexandria, and Arthur H. Ballard, Falls Church, Va., assignors to the United States of America as represented by the Secretary of the Air Force
Filed Mar. 8, 1961, Ser. No. 94,409
9 Claims. (Cl. 340—347)

The invention relates to a quantizer for converting analog information as represented by shaft rotations, translatory motions, electron beam deflections, and the like, to an unambiguous binary-decimal code.

The coding system permits smoothly varying analog functions to be converted by high speed electronic circuitry to a binary-decimal code without the danger of ambiguity. Because all successive code combinations differ by only one binary digit, an analog value which is on the boundary to two quantizing levels cannot be sensed as belonging at any level except the one immediately preceding or the one immediately following. The retention of a basically decimal system of measurements makes this coding system more easily adapted for presentation of results to a human operator than similar methods which are based on conventional binary code. The cyclic nature of the code permits a wide range of analog function to be handled by a quantizer of compact size, since the quantizing process can be performed in several stages, whose scale factors are decimally related. The system is also well adapted to mixed positive and negative numbers, permitting actual rather than relative data to be generated. The quantized data is thus in a form which permits either immediate interpretation or automatic computations to be performed with a minimum of code conversion equipment.

It is an object of this invention to provide a quantizer that uses a specific cyclic binary-decimal code to permit unambiguous readings to be taken from the shaft digitizers and converting the readings to an unambiguous binary-decimal code.

It is another object of this invention to provide a system which is capable of converting smoothly varying analog functions, such as represented by shaft rotations, translatory motions, electron beam deflections, and the like, using a specific binary-decimal cyclic code of any number of decades to binary-decimal code without danger of ambiguity.

It is a further object of this invention to provide a digitizer for transforming an analog function into an unambiguous binary-decimal code wherein the analog function is changed into a cyclic binary-decimal code by encoding means in which a normal cyclic binary code is used to represent the decimal digits in a decade and when the next higher decimal digit is an even number, and the reflection of the normal cyclic binary code is used to represent the decimal digits in a decade when the next higher decimal digit is an odd number, and the cyclic binary-decimal code is changed to an unambiguous binary-decimal code in a converter coupled to the encoder.

It is a still further object of this invention to provide a digitizer for transforming an analog function into normal cyclic binary-decimal code wherein the analog function is changed into a cyclic binary-decimal code by an encoding means in which a normal cyclic binary code is used to represent the decimal digits in a decade when the next higher decimal digit is an even number, and the reflection of the normal cyclic binary code is used to represent the decimal digits in a decade when the next higher decimal digit is an odd number, and the cyclic binary-decimal code is changed to normal binary-decimal code by a converter coupled to the encoding means.

The nature of the invention, further objects, and advantages will appear more fully upon consideration of the embodiments illustrated in the accompanying drawings and hereinafter to be described.

The cyclic-binary code structure is such that every decimal number has two representations, a normal cyclic code and a reflected cyclic code, in the equipment which quantizes the original analog data. This is illustrated in the following table for two decades:

TABLE I

| Decimal | | Cyclic Code | | |
|---|---|---|---|---|
| Tens | Units | Tens | Units | |
| 0 | 0 | 1010 | 1010 | |
| | 1 | | 1110 | |
| | 2 | | 1111 | |
| | 3 | | 1101 | |
| | 4 | | 1100 | |
| | 5 | | 0100 | Normal |
| | 6 | | 0101 | |
| | 7 | | 0111 | |
| | 8 | | 0110 | |
| 0 | 9 | 1010 | 0010 | |
| 1 | 0 | 1110 | 0010 | |
| | 1 | | 0110 | |
| | 2 | | 0111 | |
| | 3 | | 0101 | |
| | 4 | | 0100 | |
| | 5 | | 1100 | Reflected |
| | 6 | | 1101 | |
| | 7 | | 1111 | |
| | 8 | | 1110 | |
| 1 | 9 | 1110 | 1010 | |
| 2 | 0 | 1111 | 1010 | |

Extension of the cyclic code to an indefinite number of decades is possible. In applying the code to multiple decade data, the rule is consistently that the normal cyclic code is used whenever the decimal number in the next higher decade is EVEN, and the reflected cyclic code is used whenever the decimal number in the next higher decade is ODD. This structure is necessary to preserve the condition that only one binary digit change between adjacent codes for multiple decade data. The following table shows the cyclic-binary code structure for numbers 0 through 999.

TABLE II

| | | | |
|---|---|---|---|
| 000 | 1010 | 1010 | 1010 |
| 001 | | | 1110 |
| 002 | | | 1111 |
| 003 | | | 1101 |
| 004 | | | 1100 |
| 005 | | | 0100 |
| 006 | | | 0101 |
| 007 | | | 0111 |
| 008 | | | 0110 |
| 009 | | 1010 | 0010 |
| 010 | | 1110 | 0010 |
| 011 | | | 0110 |
| 012 | | | 0111 |
| 013 | | | 0101 |
| 014 | | | 0100 |
| 015 | | | 1100 |
| 016 | | | 1101 |
| 017 | | | 1111 |
| 018 | | | 1110 |
| 019 | | 1110 | 1010 |
| 020 | | 1111 | 1010 |
| 021 | | | 1110 |
| etc. | | | etc. |
| 029 | | 1111 | 0010 |
| 030 | | 1101 | 0010 |
| etc. | | | etc. |
| 039 | | 1101 | 1010 |
| 040 | | 1100 | 1010 |
| etc. | | | etc. |
| etc. | | | etc. |
| 099 | 1010 | 0010 | 1010 |
| 100 | 1110 | 0010 | 1010 |
| etc. | | | etc. |
| etc. | | | etc. |
| 199 | 1110 | 1010 | 1010 |
| 200 | 1111 | 1010 | 1010 |
| etc. | | | etc. |
| etc. | | | etc. |
| 999 | 0010 | 1010 | 1010 |
| 000 | 1010 | 1010 | 1010 |

An inspection of Table I will show that each of the cyclic code combinations in the units decade represents either a given decimal number or its nines complement. For example, 1010 may mean 0 or 9, 1110 may mean 1 or 8. This property makes the code particularly suited to positive and negative numbers as shown in the following Table III.

TABLE III

| Decimal | | | Cyclic | | |
|---|---|---|---|---|---|
| Sign | Tens | Units | Sign | Tens | Units |
| − | 0 | 9 | 1 | 1010 | 0010 |
| | | 8 | | | 0110 |
| | | 7 | | | 0111 |
| | | 6 | | | 0101 |
| | | 5 | | | 0100 |
| | | 4 | | | 1100 |
| | | 3 | | | 1101 |
| | | 2 | | | 1111 |
| − | 0 | 1 | 1 | 1010 | 1110 |
| + | 0 | 0 | 1 | 1010 | 1010 Compressed by |
| | | | 0 | 1010 | 1010 Brush Shift |
| + | 0 | 1 | 0 | 1010 | 1110 |
| | | 2 | | | 1111 |
| | | 3 | | | 1101 |
| | | 4 | | | 1100 |
| | | 5 | | | 0100 |
| | | 6 | | | 0101 |
| | | 7 | | | 0111 |
| | | 8 | | | 0110 |
| + | 0 | 9 | 0 | 1010 | 0010 |

In crossing the zero level, the only binary digit which changes is the sign digit, and the remainder of the cyclic code progresses in identical fashion on both sides of zero. Therefore, if the sign digit is disregarded in the decoding process, the correct result will be obtained. The need for dropping a count when crossing zero can be accomplished in the shaft digitizer by shifting the units brushes one increment in the direction of wheel motion. An analogous situation exists in the special case of crossing 180° longitude. By disregarding the sign digit when decoding the resulting numbers will be found to increase and then decrease, as desired. The count which was dropped at zero is reinserted by shifting the units brushes one increment opposite to the wheel of motion.

The conversion of analog functions to cyclic-binary code for plus-minus data is accomplished by means of code wheels and brushes. In generating the cyclic code for plus-minus data by means of code wheels and brushes, it is not actually necessary to shift the brush positions in crossing zero. However, the technique of shifting brushes helps to reduce quantizing error, and also avoid the phenomenon of double zero increment.

Figure 1:
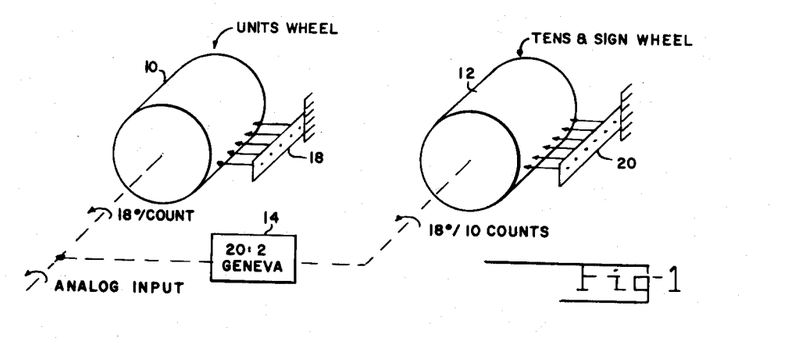
FIGURE 1 illustrates a typical encoder with fixed brushes.
Figure 2:
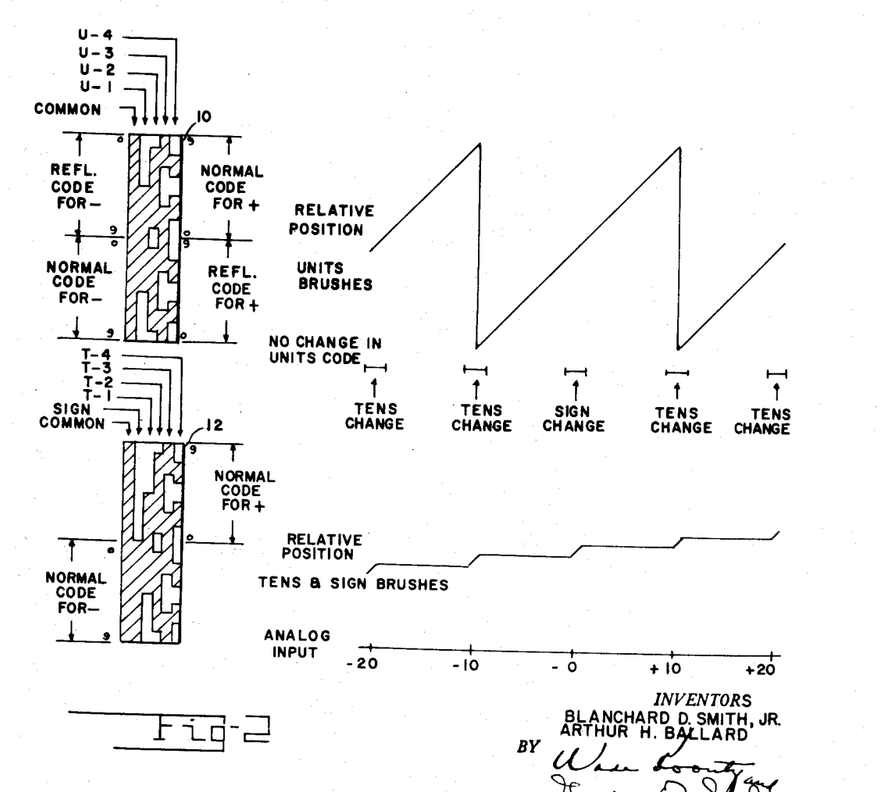
FIGURE 2 indicates the code positions on the wheels and the relative brush positions of the FIGURE 1 encoder.

A typical encoder with fixed brushes, capable of handling plus-minus data, is illustrated in FIGURES 1 and 2. As indicated, the units wheel 10 is driven by a continuous analog input with a scale factor of 18° per count. Every ten counts, that is, twice per revolution of the units wheel, the tens wheel 12 is stepped 18° by an intermittent Geneva-type transfer mechanism 14. Although the units wheel is in motion when the tens wheel steps, no change in the units code occurs in the range ±1 count (±18°) from the point of the tens code change. The range of data from −99 to +99 is illustrated in FIGURE 2 and the sign code taken from an extra track on the tens wheel. The units wheel has twenty code positions which represent 0–9 in both normal and reflected cyclic code. The reflected cyclic code for any decimal number is the same as the normal cyclic code for the nines complement of that number. For negative numbers, the codes which were reflected become normal codes, and the codes which were normal become reflected codes. The tens wheel also has twenty code positions representing 0–9 in normal code increasing in both directions from mid-scale.

In crossing through analog zero, the only code change is in the sign digit, the units code being constant ±1 count in either direction from this point, and the tens code being constant ±10 counts in either direction. As the analog input increases from zero, the units code increases through 0–9 in normal code for a tens code of zero (EVEN); then increases through 0–9 in reflected code for a tens code of one (ODD); and so on. If the analog input decreases from zero, the units code again increases through 0–9 in normal code, which is identical with a decrease 9–0 in reflected code, for a tens code of zero (EVEN); then increases through 0–9 in reflected code, which is identical with a decrease 9–0 in normal code, for a tens code of one (ODD); and so on. One difficulty with this fixed brush arrangement is that for every coded output number X, the corresponding analog range is $X_0^{+1}$ for positive numbers and $X_{-1}^{+0}$ for negative numbers. Another difficulty is the occurrence of both a plus and minus zero in the code output, representing a total analog range from −1 to +1. If these coding difficulties are objectionable, they can largely be overcome by shifting the units brushes one count in crossing through analog zero.

Figure 3:
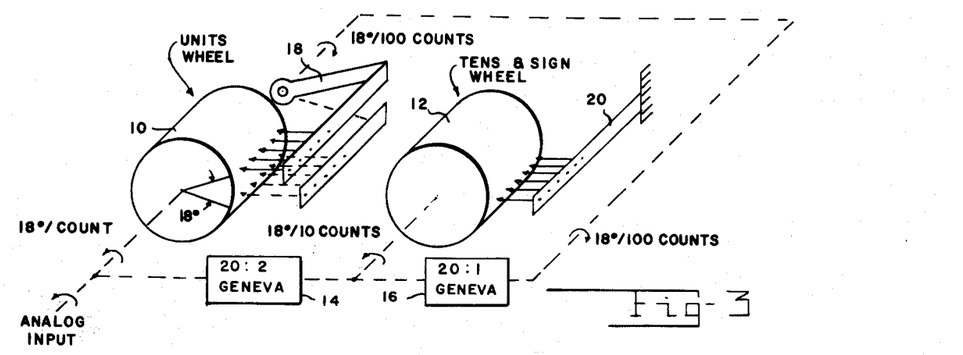
FIGURE 3 illustrates an encoder which includes physical shifting of the units wheel brushes.
Figure 4:
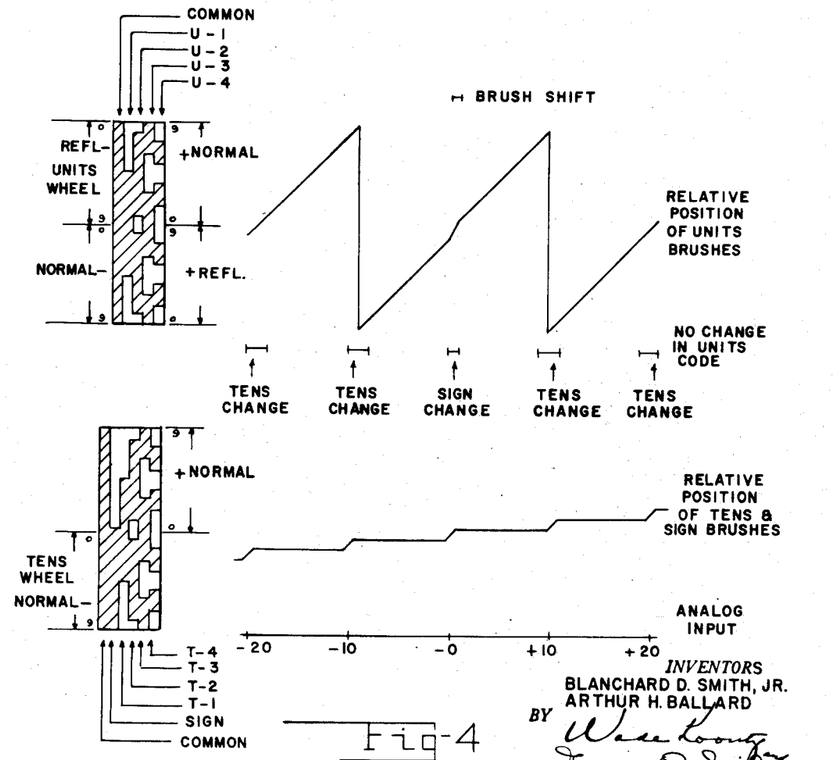
FIGURE 4 indicates the code positions on the wheels and the relative brush positions of the FIGURE 3 encoder.

An apparatus for physically shifting the units brushes is shown in FIGURES 3 and 4. In addition to the Geneva transfer mechanism 14 of the FIGURE 1 and FIGURE 2 form of the invention, a Geneva mechanism 16 is employed to produce an 18° rotation of the units brush assembly 18 during the analog range −0.5 to +0.5. The direction of brush rotation is always opposite to the wheel rotation so that the two codes for plus and minus zero are covered in the single analog increment −0.5 to +0.5. The tens brush assembly 20 is not shifted, since doing so would cause ten counts to be dropped instead of one. FIGURE 4 illustrates the brush positions relative to the code wheels as a function of analog input at the right of the figure. With a few exceptions, the analog range corresponding to an output code X±0.5 represents the minimum quantizing error for a revolution of one count. The exceptions occur when the analog input is a non-zero multiple of ten. For example, an output code of +9 actually represents $+9_{-0.5}^{+1.0}$ and an output code of +10 actually represents $+10_{-0}^{+0.5}$. In adopting the brush-shifting method, the permissible errors due to gearing backlash have been reduced by a factor of two, ±9° instead of ±18°.

Figure 5:
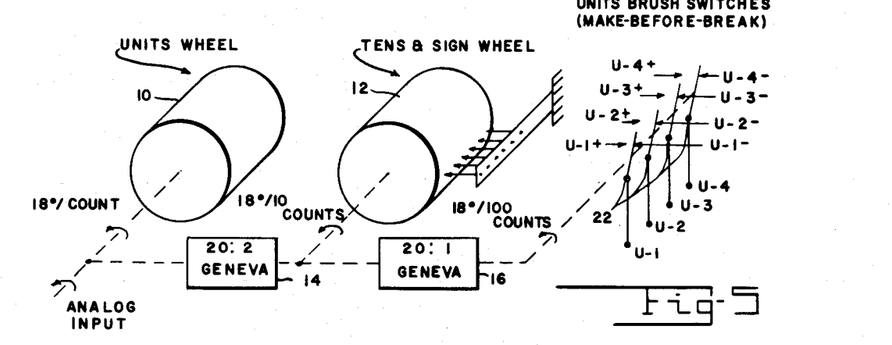
FIGURE 5 illustrates an encoder which includes two sets of brushes used with the units wheel and brush switching of the units wheel brushes.

Rather than physically shifting the units brushes, a third form of the invention may be employed using two sets of brushes and brush switching. The second Geneva mechanism 16, as shown in FIGURE 5, actuates four double-throw contacts 22 to switch from one set of units brushes to the other, in crossing through analog zero. The first two options use the double-throw contact switching structure for switching from one of two sets of brushes to the other set of brushes.

Figure 6:
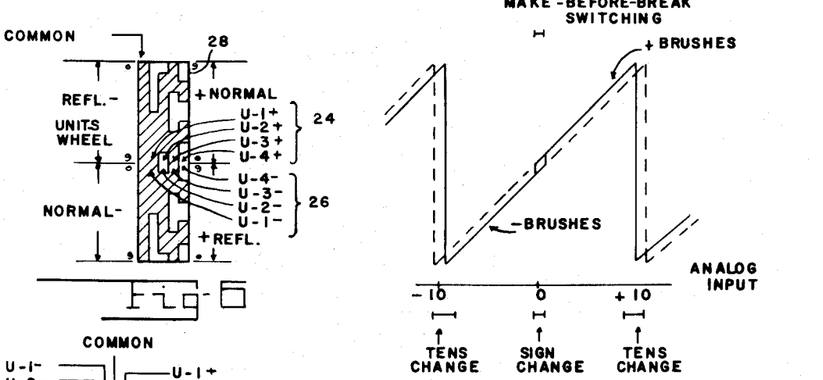
FIGURE 6 indicates the code positions on the units wheel and the relative brush positions of the FIGURE 5 encoder for a first switching option.

The first option uses two sets of brushes 24 and 26 displaced one count on the same set of tracks 28. Since both sets of brushes are sensing the same units code, zero, during switchover, the contacts can be of the make-before-break type. Externally, the effects are the same as if the brushes had been physically shifted.

Figure 7:
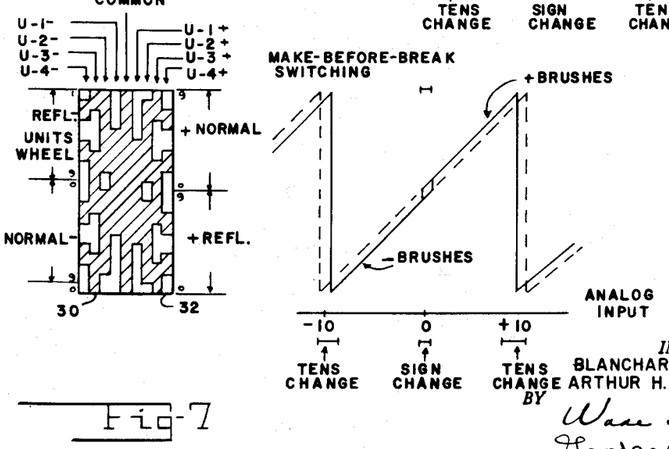
FIGURE 7 indicates the code positions on the units wheel and the relative brush positions of the FIGURE 5 encoder for a second switching option.

A second option, shown in FIGURE 7, is to provide a first 30 and a second 32 set of coding tracks for the units wheel. The two sets of tracks are displaced one count and all brushes are assembled in line. The brushes are switched as shown in FIGURE 5 to give the desired code progression.

Figure 8:
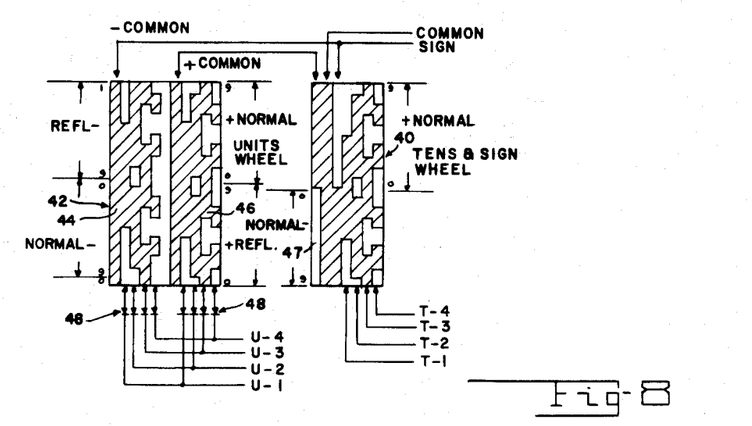
FIGURE 8 indicates the code positions on the wheels of the FIGURE 5 encoder for the third switching option.

FIGURE 8 illustrates a third option which uses the sign digit on the tens for highest decade wheel 40 to accomplish brush switching on the units wheel 42. The two sets of tracks 44 and 46 on the units wheel are not in electrical contact with each other. The minus tracks on the units wheel are energized by a series circuit through the sign track on the tens wheel. The sign digit is a ONE for negative numbers. The plus tracks on the units wheel are energized by a series circuit through a special "inverse sign" track 47 on the tens wheel. Corresponding brushes for the plus and minus tracks on the units wheel are tied together through isolation diodes 48. This option has the advantage of accomplishing an effective brush shift without having to add a second Geneva mechanism.

Figure 9:
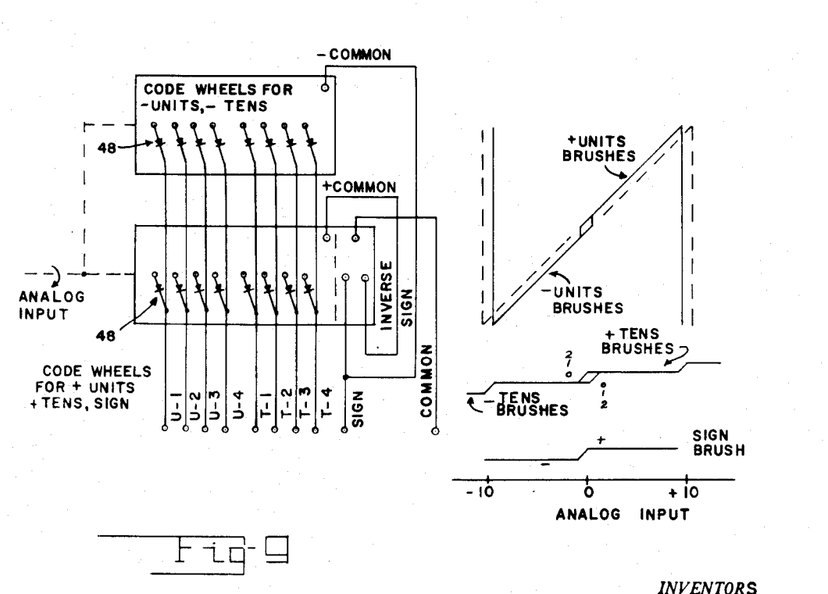
FIGURE 9 indicates switching structure on the wheels and the relative brush positions of the FIGURE 5 encoder for a fourth switching option.

The fourth option shown in FIGURE 9 is the most effective although it requires the greatest amount of equipment. The coding wheels for all decades are duplicated, one negative and the other positive, with the exception of the sign track; that is, there are two units wheels, one +tens and sign wheel, and one −tens wheel. Both units wheels are driven from the same analog input shaft and there is a relative displacement of one count between the two units wheels. The Geneva mechanisms between decades are also duplicated and arranged to operate with a relative displacement of one count. Switching between plus and minus code tracks is accomplished by the sign and inverse sign tracks as described in the third option. Switching between displaced brushes in all decades when passing through analog zero produces a uniform code progression through the entire range of data. All output codes X, including zero, can be interpreted as X±0.5. This option is readily adapted to combine indicator-digitizer units, since plus-minus indicators are normally constructed as duplicate units with shutter switching.

The cyclic-binary code derived from the analog functions has the ambiguity that the code may represent the true value or its nines complement value. This situation has developed because of the use of normal cyclic code and reflected cyclic code which causes the repeating of a given decade after twenty increments instead of ten. The value is not uniquely determined, therefore, unless the EVEN-ODD condition of the next higher decade is taken into account. The interdependence between decades can be removed in either of the following ways: First, by converting the cyclic code to excess-three code as described in copending patent application Serial No. 62,311, filed June 17, 1958, for Cyclic Binary-Decimal to Excess-Three Code Converter, now abandoned; or, Second, converting to normal cyclic code by complementing the highest order cyclic binary digit if the next higher decimal digit is ODD.

Normal cyclic code converters may be either of two types, the electronic or the relay. The electronic converter utilizes a combination of bistable circuits, gating means and conversion matrices; while the relay converter accomplishes the removal of the ambiguity solely by means of relays.

Figure 10:
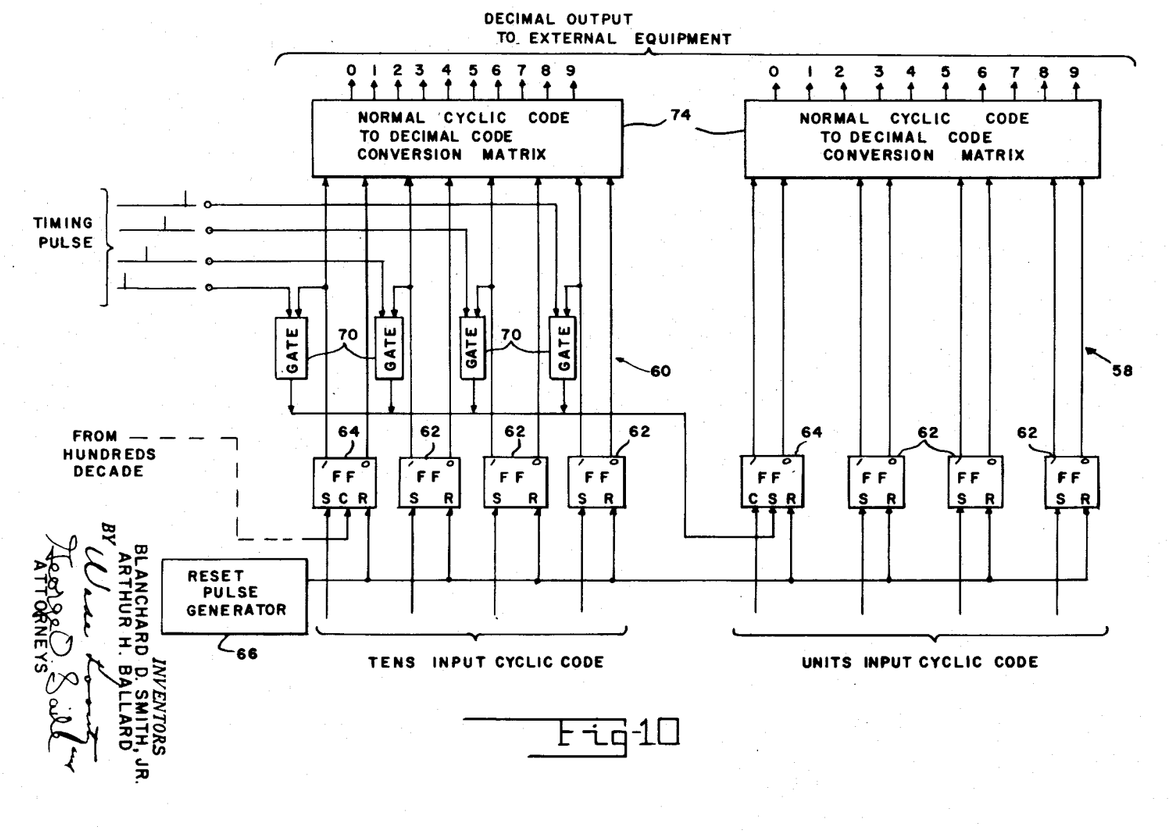
FIGURE 10 is a schematic diagram of an embodiment of the cyclic binary-decimal to decimal code converter.

Referring now more particularly to the electronic converter shown in FIGURE 10, which includes a units cyclic code converting means 58 and a multiple code converting means 60 for each decade above the units decade, the converter performs an intermediate conversion from reflected cyclic code, in any decade where it occurs, to normal cyclic code. There are four bistable or flip-flop circuits in each decade, three of these circuits 62 have set and reset input terminals and the fourth bistable circuit 64 has both the reset and set terminals and a third terminal, the complement terminal. The bistable circuits act as a temporary storage during this conversion. Initially, all bistable circuits are reset to their ZERO state by pulsing their reset R terminal with reset pulses derived from reset pulse generator 66. The source of cyclic-binary code is parallelly connected with the set input terminals S of the bistable circuits 62 and 64 in the appropriate decades. The input data is inserted in parallel by pulsing the set S terminals with a pulse for a ONE or no pulse for a ZERO in the code.

Conversion from reflected to normal cyclic code in the units decade cyclic code converting means 58 is accomplished by complementing in the bistable circuit 64 the most significant digit if the tens decade is ODD, and leaving it unchanged if the tens decade is EVEN. The normal cyclic code is used in the tens decade if it is the most significant decade. It should be noted that the number of ones in each normal cyclic code is EVEN if the corresponding decimal number is EVEN, and ODD if the corresponding decimal number is ODD. Therefore, the most significant bistable circuit 64 in the units register is complemented at the C terminal a number of times equal to the number of ones stored in the tens register. The complementing pulse train is generated by sampling the outputs of each bistable circuit in the tens register with timing pulses staggered in time, and combining the outputs of all sampling gates 70.

If the number in the tens decade is ODD, then the reflected code will occur in the units decade. After all four timing pulses, the first bistable circuit 64 in the units decade will have been complemented an ODD number of times which converts the reflected code to normal code. If the tens decade was EVEN, the first flip-flop circuit 64 in the units decade will be complemented an EVEN number of times which leaves unchanged the normal code originally inserted.

After conversion of all decades to normal cyclic code, identical conversion matrices 74 are used in all decades to generate a one-out-of-ten parallel decimal code. The conversion matrices can be designed using well-known Boolean logic rules not unique to this invention. The conversion matrices may produce other output codes also, the important feature of invention being the conversion of all decades to normal cyclic code as an intermediate step.

To extend the decoder to additional decades, multiple cyclic code converting means 60, identical to that illustrated in the drawing for the tens decade, must be added for each higher decade, and the first flip-flop circuit 64 in each decade, except the highest, must be capable of accepting a complementing pulse train. Four additional time pulses must be added for each higher decade, arranged in time so that all timing pulses are noncoincident. Conversion from reflected to normal cyclic code is accomplished sequentially. The normal cyclic code in the highest decade is sampled in the sampling gates 70 and the first bistable circuit 64 in the next lower decade complemented 0, 1, 2, 3 or 4 times according to the number of ones in the first or higher decade. The second decade is therefore always converted to normal cyclic code. The second decade is then sampled to convert the third decade and so on. The total number of timing pulses required is equal to the total number of bistable circuits, less four.

Figure 11:
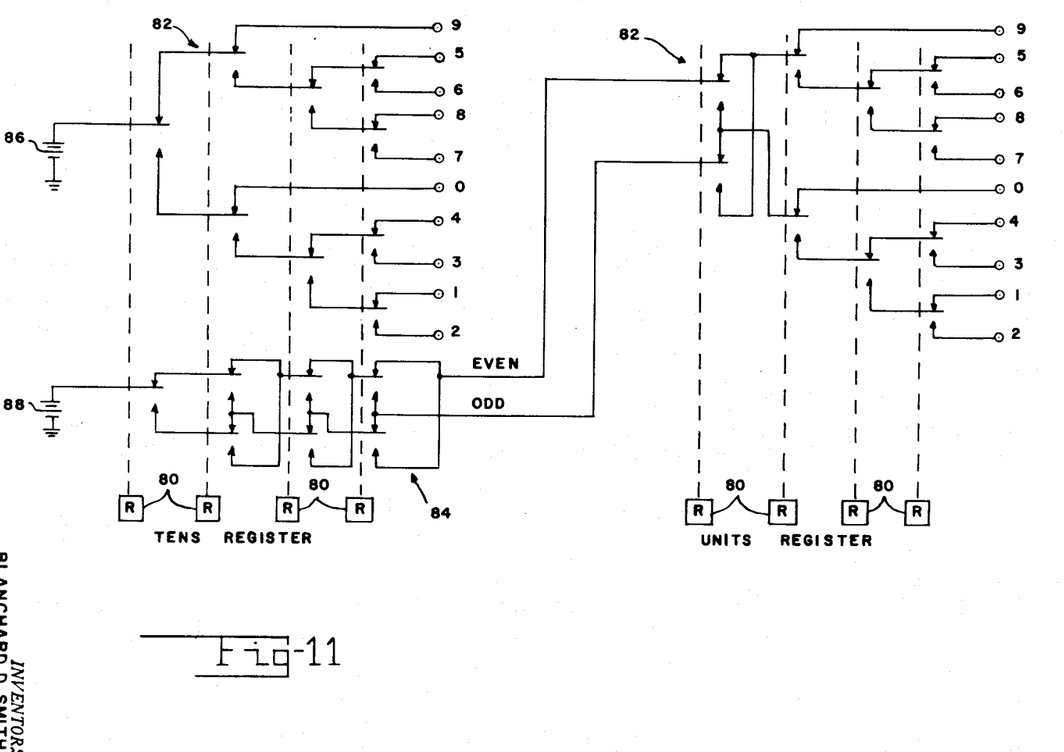
FIGURE 11 is a schematic diagram of a second embodiment of the binary-decimal to decimal code converter.

The relay decoder, illustrated in FIGURE 11, accomplishes the removal of the interdependence between decades electromechanically and converts the cyclic-binary code to decimal code. The cyclic-binary code, made up of four binary digits for each decade, is inserted in the proper register; that is, the units register, the tens register, and so on. There is a relay 80 for each binary digit in each decade. The relays are electrically connected to a bank 82 of double-throw relay contacts, which has a maximum of four double-throw contacts per relay, for converting the normal cyclic code to decimal code. All registers other than the units register additionally have a bank 84 of double-throw relay contacts, which has a maximum of two double-throw contacts per relay, for determining ODDness or EVENness of the number stored. The outputs of the ODD-EVEN bank 84 are connected to the most significant digit's double-throw contacts of the normal cyclic to decimal code bank 82 of the next lower register. In the highest register, the most significant digit's double-throw contacts for both banks 82 and 84 are connected to current sources 86 and 88, respectively. The insertion of a ONE into a register actuates the register's relay to effect the movement of the double-throw contacts to the contact's other position. The insertion of a ZERO into a register causes no change in the contacts. The current flow through the banks in each decade is thereby altered to determine the number's decimal value for that decade and to provide a current flow to the EVEN or ODD input of the next lower decade when the number in the instant decade is EVEN or ODD, respectively.

It is possible to define an alternate cyclic code structure in which the definitions of normal and reflected code are interchanged. The reason for not preferring this alternate code structure is that its rules of synthesis are not nearly so elegant. The rule for choosing between normal and reflected code in the lower decades is actually controlled by the parity (odd or even number of ones) in all preceding binary digits, except sign. If the parity of the normal code were opposite to the odd-even state of the decimal number represented, the proper choice of normal or reflected code in the lower decades would not be nearly so obvious. The rule becomes "use normal code if there are an even number of even decimal numbers preceding, and reflected code if there are an odd number of even decimal numbers preceding." For this reason, the first code structure is preferred, in which the odd-even state of the normal code agrees with the odd-even state of the decimal number represented.

The invention is not intended to be limited to the examples of embodiments shown and described but may, on the contrary, be capable of many modifications without departing from the spirit of the invention.

We claim:

1. An encoder for converting analog information of mixed positive and negative values into a cyclic binary-decimal code comprising a code units wheel having cyclic binary-decimal code positions thereon driven by a continuous analog function input, code wheels having cyclic binary-decimal code positions thereon representing higher decades, means for stepping said higher decade code wheels at appropriate times during the revolution of said units wheel, a brush means in conjunction with each of said wheels maintaining electrical contact with their respective said wheels for removing the said cyclic binary-decimal code, and means for rotating the said units wheel brush means opposite to the wheel rotation a predetermined amount when the said analog function enters a specific range of values encompassing analog zero.

2. An encoder for converting analog information of mixed positive and negative values into a cyclic binary-decimal code comprising a code units wheel having cyclic binary-decimal code positions thereon driven by a continuous analog function input, code wheels having cyclic binary-decimal code positions thereon representing higher decades, means for stepping said higher decade code wheels at appropriate times during the revolution of said units wheel, a pair of brush means in conjunction with said units wheel for removing the said cyclic binary-decimal code, one of said pair of brush means at a given time maintaining electrical contact with said units wheel, a brush means in conjunction with each of said higher decade wheels maintaining electrical contact with their respective said wheels for removing the said cyclic binary-decimal code, and means for switching from one of said pair of brush means to the other when the said analog function enters a specific range of values encompassing analog zero.

3. The encoder as claimed in claim 2 wherein said units wheel has a single set of tracks thereon and said pair of brushes are displaced one count on the same set of tracks on said wheel.

4. The encoder as claimed in claim 2 wherein said units wheel has two sets of tracks displaced one count and said pair of brush means are assembled in line.

5. The encoder as claimed in claim 4 wherein said sets of tracks are in electrical contact with one another.

6. The encoder as claimed in claim 2 wherein the said means for stepping includes a Geneva mechanism.

7. A system for converting a cyclic binary code having normal and reflected representations for each decimal number to decimal code comprising a source of said cyclic code having four binary digits representting each decade; a bistable temporary storage means having a ONE and a ZERO output for each binary digit; means connecting said cyclic code source to said storage means; a normal cyclic to decimal code conversion matrix connected to the said outputs of said storage means in each decade; means for complementing the said storage means of the most significant binary digit of each decade each time that a pulse representing a ONE is sent to said conversion matrix in the next higher decade whereby said cyclic code is completely converted to its normal representation; and means for resetting said storage means to ZERO at the beginning of each conversion cycle.

8. A system for converting a cyclic binary code having normal and reflected representations for each decimal number to decimal code comprising a source of cyclic code; a units cyclic code converting means including three bistable circuits each having set and reset input terminals and ZERO and ONE output terminals, a fourth bistable circuit having set, complement and reset input terminals and ZERO and ONE output terminals, and a normal cyclic to decimal code conversion matrix connected to said output terminals; a multiple cyclic code converting means for each decade to be converted above the units decade including three bistable circuits each having set and reset input terminals and ZERO and ONE output terminals, a fourth bistable circuit having set, complement and reset input terminals and ZERO and ONE output terminals, a sampling gate having an input and an output connected to the said ONE output of each of said bistable circuits which is opened for a predetermined time by the occurrence of a ONE pulse from the bistable circuit, and a normal cyclic to decimal code conversion matrix connected to said output terminals;

means parallelly connecting said cyclic code source with said set inputs of the said bistable circuits to the appropriate decades; the most significant digit of each decade being inserted into the said bistable circuits containing said complement input; means coupled to said reset inputs for resetting said bistable circuits to ZERO at the beginning of each conversion cycle; a source of timing pulses; means connecting said timing pulse source with the inputs of each of said sampling gates such that the said timing pulses are non-coincident and the first in time reach the gates of the highest decade initially and accordingly the pulses in time reach lower decades down through the decade immediately above the unit decade; and means connecting the complement input of said fourth bistable circuit in each decade with the said outputs of the said sampling gates in the next higher decade for providing a complementing pulse train to the most significant digit in each lower decade.

9. A system for converting a cyclic binary code having normal and reflected representations for each decimal number to decimal code comprising a source of said cyclic code having four binary digits representing each decade; a relay means for each binary digit; means for connecting said cyclic code source to said relay means; the four relay means in each decade having a bank of double-throw contacts for converting said normal representations to decimal code; and the four relay means in each decade above the units decade having a bank of double-throw contacts for determining the ODDness or EVENness of the number in each decade; and providing an output for each alternate case to the appropriate input of the most significant digit in the said normal converting bank of the next lower decade for converting said cyclic binary code completely to its normal representation.

References Cited by the Examiner

UNITED STATES PATENTS 2,975,409   3/61   Petherick _____________ 340—347

MALCOLM A. MORRISON, *Primary Examiner.*

STEPHEN W. CAPELLI, *Examiner.*